United States Patent [19]

Bochan

[11] 4,285,214
[45] Aug. 25, 1981

[54] FLEXIBLE COUPLING

[75] Inventor: John Bochan, Louisville, Ky.

[73] Assignee: General Electric Company, Louisville, Ky.

[21] Appl. No.: 107,211

[22] Filed: Dec. 26, 1979

[51] Int. Cl.³ .............................................. F16D 3/52
[52] U.S. Cl. ...................................... 64/15 B; 64/12; 64/15 R; 64/17 R
[58] Field of Search ................. 64/15 R, 15 B, 12, 31, 64/17 R, 11 R

[56] References Cited

U.S. PATENT DOCUMENTS

| 1,214,307 | 1/1917 | Hosford | 64/15 B |
| 1,392,342 | 10/1921 | Laycock | 64/15 R |
| 2,627,733 | 2/1953 | Amberg | 64/15 B |
| 2,860,495 | 11/1958 | Stark | 64/15 R |
| 2,968,169 | 1/1961 | Davis | 64/15 B |
| 3,224,224 | 12/1965 | Kudriavetz | 64/11 R |
| 3,468,183 | 9/1969 | Shwartzberg | 64/15 R |
| 3,548,613 | 12/1970 | Mounteer | 64/15 B |
| 3,789,623 | 2/1974 | Retali | 64/15 B |
| 3,934,487 | 1/1976 | Becker | 64/15 B |
| 4,031,715 | 6/1977 | Shekar | 64/15 B |

Primary Examiner—Ira S. Lazarus
Attorney, Agent, or Firm—H. Neil Houser; Radford M. Reams

[57] ABSTRACT

A flexible coupling for drivingly interconnecting a driving member and a driven member. The coupling includes a first coupling arrangement adapted for connection to the driven member and a second coupling arrangement adapted for connection to the driving member. The coupling arrangements are interconnected by a plurality of flexible arms. Each arm includes first and second curved portions connected by a planar portion.

8 Claims, 5 Drawing Figures

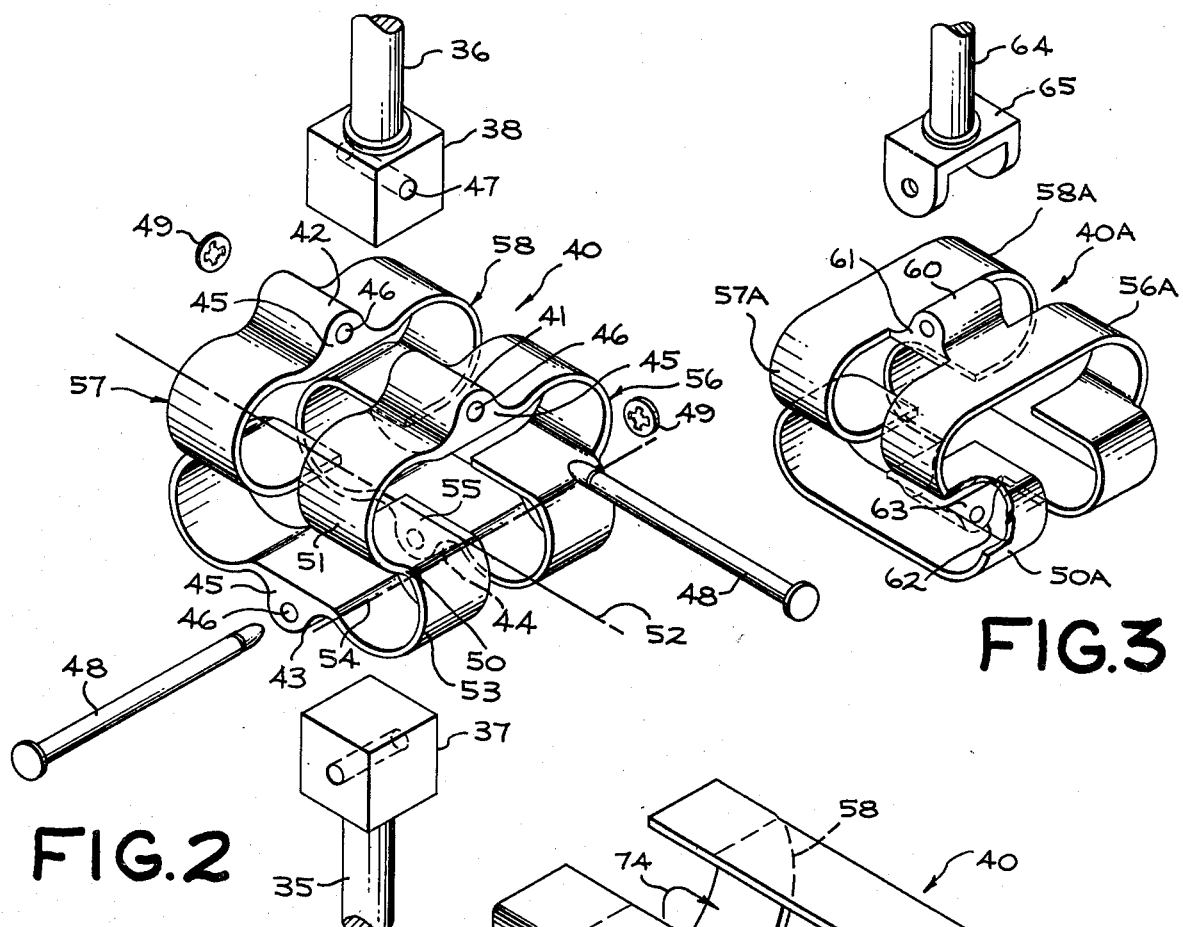

FLEXIBLE COUPLING

BACKGROUND OF THE INVENTION

This invention relates to an improved flexible coupling for connecting driving and driven members and, more particularly, to an improved coupling useful with appliances such as automatic washing machines, for example.

It is often desired to connect a rotary driving member to a rotary driven member under circumstances where the axes of the two members are not aligned. They may be misaligned laterally or they may be canted with respect to each other. Additionally the straight line distance between the points of attachment to the two members may be variable. The rotary transmission problems are more severe when vibration or other movement of one or both of the driving and driven members causes the orientation and spacing of these members to change during operation.

An example of such a situation is an automatic clothes washing machine. Such machines customarily proceed through a sequence of operations or cycles in order to wash, rinse and then spin dry fabrics. A typical machine has a stationary tub, a clothes retaining basket, and a vertical axis vaned agitator. During the wash and rinse operations the agitator is oscillated back and forth while the clothes retaining basket is prevented from movement. In the spin dry or liquid extraction operations the basket and agitator are rotated or spun in unison at high speed to extract liquid from the clothes by centrifugal force. During wash and rinse operations a pump constantly recirculates the washing liquid through a filter to remove lint and other contaminants. During the liquid extraction operations the pump operates to remove washing liquid from the machine.

It is desirable that all of these operations be accomplished by use of a single motor. To this end the washing machine normally includes a transmission for providing oscillation of the agitator during washing and rinsing operations and rotation of the agitator and basket during the spin or liquid extraction operation. Normally the transmission is driven by an endless belt which, in turn, is driven by a reversible electric motor through a clutch mechanism. The motor also drives the pump. The connection between the motor and the pump must be flexible to accommodate various positions that the motor may assume relative to the pump, axially, laterally and angularly. Additionally this coupling must be able to accommodate movement between the pump and motor as the pump normally is attached to the stationary tub while the motor is part of the moving system of the machine and tends to vibrate during operation.

U.S. Pat. No. 4,031,715, assigned to General Electric Company, assignee of the present invention, is illustrative of a prior art approach to the connection between the motor and the pump in an automatic washing machine. It utilizes a one-piece flexible plastic molded body which is attached to the motor output shaft and to the pump input shaft. The body is provided with a number of longitudinally extending slits dividing it into a plurality of fingers which are bowed as the coupling is attached to the machine. The very large number of fingers tends to cause the pump to be driven at a uniform speed, as the average length of the fingers tends to remain constant despite relative motion of the clutch with respect to the pump. However, collars of this type are relatively stiff and tend to resist relative movement between the clutch and the pump and tend to cause some variations in the pump speed.

It is an object of the present invention to provide a new and improved flexible coupling.

It is another object of this invention to provide such an improved coupling which transmits rotary motion from a driving to a driven member in a substantially uniform manner.

It is yet another object of this invention to provide such an improved coupling which compensates for variations in the alignment of the driving and driven members occurring during operation.

SUMMARY OF THE INVENTION

This invention relates to a flexible coupling for connecting a driving member to a driven member; including a first coupling arrangement adapted for pivotal connection to one of the driving and driven members and a second coupling arrangement adapted for pivotal connection to the other of the driving and driven members. The coupling arrangements are drivingly interconnected by a plurality of flexible arms. Each of the flexible arms includes a first arm portion smoothly curved about a first axis, a second arm portion smoothly curved by a second axis perpendicular to the first axis and a planar intermediate portion joining the first and second arm portions and disposed generally parallel to the first and second axes. The flexible coupling will uniformly transmit rotary motion from the driving member to the driven member even though the driving and driven members are out of alignment and expeditiously accommodates variations in the alignment between the driving and driven members occurring during operation.

BRIEF DESCRIPTION OF THE DRAWINGS

FIG. 2 is an exploded perspective view of the flexible coupling arrangement used in the machine of FIG. 1.

FIG. 3 is a perspective view of a flexible coupling incorporating another form of the present invention.

FIG. 4 is a perspective view illustrating a blank for forming one embodiment of the present invention.

FIG. 5 is a perspective view showing the blank of FIG. 4 in its partially folded configuration.

DESCRIPTION OF PREFERRED EMBODIMENTS

Figure 1:
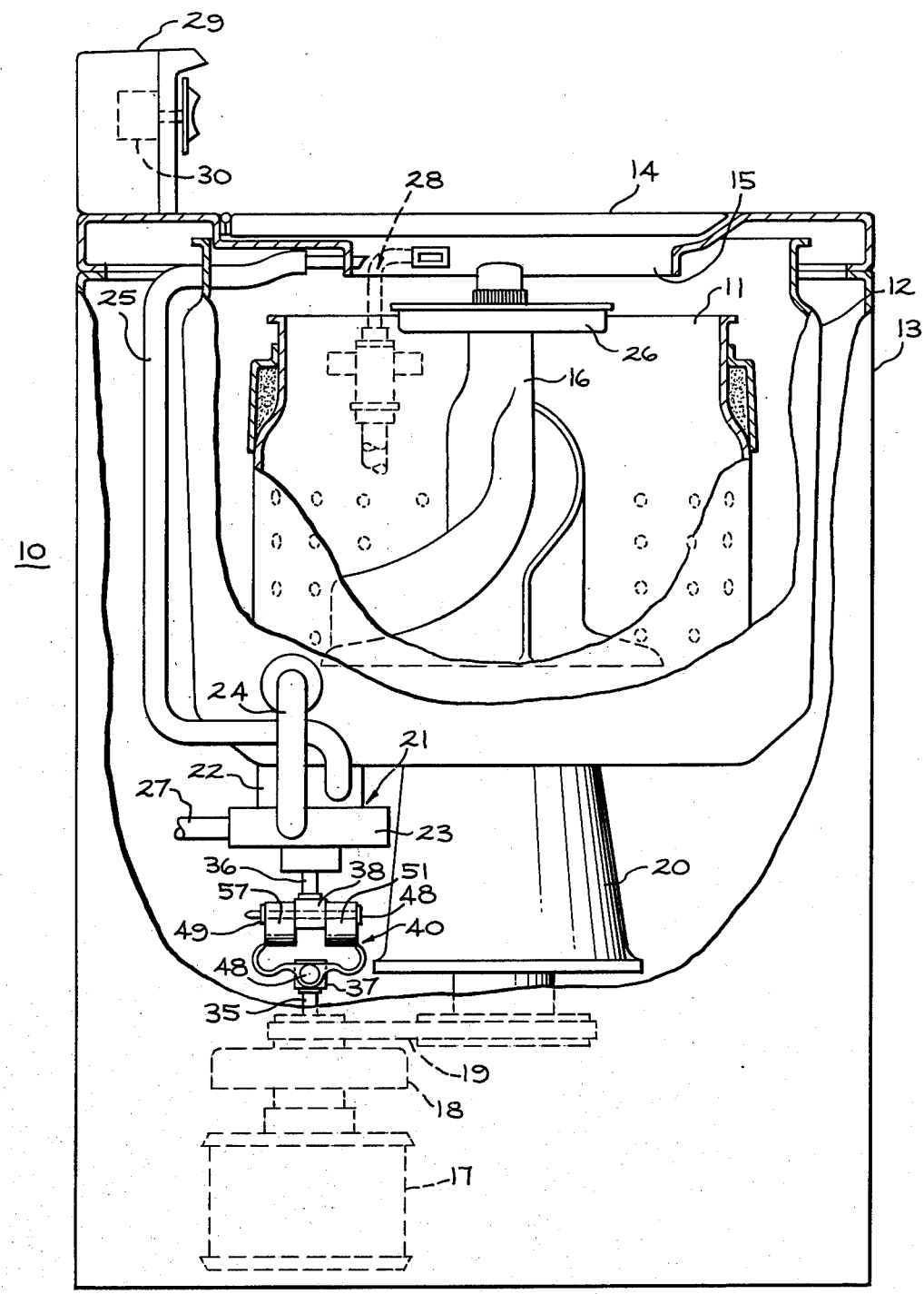
FIG. 1 is a somewhat simplified side elevational view of a clothes washing machine incorporating one form of the flexible coupling of the present invention, the view being partly broken away and partly in section.

Referring now to FIG. 1, there is shown in a somewhat simplified schematic form a washing machine 10 having a conventional perforated wash basket 11 disposed within an outer, imperforate, stationary liquid retaining tub 12. The tub receives a body of liquid, which will fill the basket because of the perforations. The basket receives fabrics, such as clothing, to be washed in the liquid. The outer tub 12 is rigidly mounted within an appearance cabinet 13 which includes an access cover or lid 14 mounted by hinges (not shown) for providing access to the basket through an opening 15 in the top of the cabinet. An agitator 16 is positioned in the center of the basket 11 and is mounted for oscillatory motion, while the basket 11 is being held stationary, to impart washing energy to liquid and fabrics within the basket. The basket 11 and agitator 16 also are mounted for conjoint high speed rotation in order to extract liquid from the fabrics within the basket by centrifugal force.

The basket 11 and agitator 16 are driven by a reversible motor 17 through a drive mechanism including a clutch 18 and an endless belt 19, connecting the clutch 18 to a transmission 20. When the motor 17 is rotated in one direction the transmission causes a slow speed oscillation of the agitator 16 to provide for the washing operation. Conversely, when the motor is driven in the opposite direction the transmission 20 drives both the agitator and basket at high speeds for centrifugal extraction of liquid from fabrics within the basket.

In addition to operating the transmission 20, motor 17 also provides a direct drive for a pump mechanism 21, having separate pumping units 22 and 23. During the wash and rinse operation the pump unit 22 withdraws liquid from the tub through a conduit 24 and discharges it through a conduit 25. The conduit 25, in turn, discharges the liquid above the top of the basket from whence it flows through a filter 26 mounted to the top of the agitator 16. During spin operation the pump unit 23 withdraws liquid from the tub 12 through the conduit 24 and discharges it to drain through a conduit 27.

A water inlet mechanism generally shown at 28 provides the machine with an appropriate mixture of hot and cold water. A control compartment 29 is mounted to the top of the cabinet 13 and includes a number of control devices such as that illustrated at 30 by which the operator may select the desired sequence of operation.

It is desirable that motor 17 operate the pump 21 at a uniform speed since variations in the speed of rotation of the pump impeller will adversely affect the pumping action and will tend to cause vibrations of the pump that result in undesirable noise. It will be readily understood that, during manufacture, the output shaft 35 of the motor may not be perfectly aligned with the input shaft 36 of the pump. Such misalignment may be in the lateral direction or angular in the sense that the shafts are canted relative to one another or any combination of such misalignments. Also the distance between these elements may vary. While the pump 21 is firmly connected to the stationary tub 12, the motor 17 forms part of the moving system of the washing machine and tends to vibrate and move about all three axes during operation of the washing machine, particularly during spin extraction. Therefore the orientation and spacing between the motor output shaft (or shaft extension) 35 and the pump input shaft 36 changes during washer operation. A flexible coupling 40 drivingly interconnects motor output shaft 35 with pump input shaft 36. The flexible coupling 40 transmits rotary motion from shaft 35 to shaft 36 in a substantially uniform manner while compensating for any misalignment between the shafts, as well as variations in such misalignment occurring during operation.

Referring now particularly to FIG. 2 there is shown in detail the flexible coupling 40 for drivingly interconnecting the motor output shaft 35 with the pump input shaft 36. The coupling 40 includes a first coupling arrangement comprising coupling members 41 and 42 adapted for pivotal connection to a cubical extension 38 of the pump input shaft 36. The coupling 40 also includes a second coupling arrangement comprising a pair of coupling members 43 and 44 adapted for pivotal connection to a cubical extension 37 of the motor output shaft 35. More specifically each of the coupling members 41–44 is formed as an elongated member having flat end faces 45 and a longitudinally extending bore 46. Cooperating faces 45 of the members 42 and 43 are positioned against opposed faces of the cubical extension 38 with the bores 46 aligned with a bore 47 through the extension. An elongated pin 48 is inserted through the coupling members 42 and 43 and the extension 38 and is held in place by a press-fit washer 49. The coupling members 43 and 44 are pivotally connected to the extension 37 in a similar fashion by another pin 48 and washer 49.

The coupling member 41 and the coupling member 43 are drivingly interconnected by a flexible arm 50 having a first arm portion 51 smoothly curved about an axis 52 and a second arm portion 53 smoothly curved about an axis 54 generally perpendicular to axis 52. The arm portions 51 and 53 and interconnected by a generally planar intermediate portion 55. In the rest or unstressed condition illustrated in FIG. 2, the intermediate portion 55 lies in a plane which is substantially parallel to both the axes 52 and 54. In a similar manner the coupling member 41 is drivingly interconnected with the coupling member 44 by a flexible arm 56 shaped in the same configuration as the arm 50. Also coupling member 42 is interconnected with coupling member 43 and coupling member 44 by additional flexible arms 57 and 58 respectively.

The pivotal connection of the coupling members 41-42 with the shaft extension 38, the pivotal connection of coupling members 43-44 with the shaft extension 37, and the flexibility of arms 50, 56, 57 and 58 act in conjunction so that the flexible coupling 40 effectively functions as a double universal joint. This enables coupling 40 to compensate for the various forms of possible misalignment between the shafts 35 and 36 as well as alterations in the relative alignment during operation. Additionally, since coupling 40 is effectively a double universal joint, shaft 36 will be driven conjointly with the shaft 35. In this regard, it will be understood that, with a single universal joint connection, the output shaft has the same instantaneous speed as the input shaft only once in each ninety degrees of rotation while, with a double universal joint connection, the two shafts constantly have the same instantaneous speed. Additionally the flexibility of arms 50, 56, 57 and 58 accommodate variations in the linear distance between the two shaft extensions.

Forces imparted to the coupling 40 by the motor shaft 35 tend to act in the shear mode upon the flexible arms 50, 56, 57, and 58. These arms effectively transfer those moments to the coupling members 41 and 42 and thence to the pump shaft 36. The generally planar intermediate portions of the flexible arms, such as portion 55 of arm 50, enable the arms to change in direction of the force without causing the arms to twist so as to collapse.

FIG. 3 illustrates a slightly modified flexible coupling 40A, including flexible arms 50A, 56A, 57A, and 58A. In coupling 40A the coupling members 41 and 42 have been omitted and replaced by a single coupling member 60 which is formed as part of a web 61 which is integral with one end of each of the flexible arms. A similar coupling member 62 and web 63 is integral with the other end of the flexible arms. The orientation of coupling members 60 and 62 relative to the arms is at right angles to coupling members 41-42 and 43-44, respectively. With coupling 40A the driving and driven members would be slightly modified as illustrated by shaft 64 and U-shaped extension 65, which fits over the coupling member 60 for pivotal connection thereto.

Each of the couplings 40 and 40A may be molded from a suitable flexible plastic material such as polypropylene. The normal or unstressed position of the couplings is generally as indicated in FIGS. 2 and 3. However, the flexible arms may move into various configurations other than the rest position to help accommodate movement between the driving and driven members.

FIGS. 4 and 5 illustrate another manner in which the flexible coupling 40 may be formed. As shown, the coupling 40 may be formed as a continuous, flat band 70 of flexible material in the shape of an open square or rectangle. The coupling members 41-44 are formed integrally with the band 70. The first pair of coupling members 41 and 42 extend from one surface of the band at the midpoints of a first pair of opposed sides of the square while the other pair of coupling members 43 and 44 extend from the other surface of the band at the midpoints of the other opposed pair of sides of the square. The sides of the square or rectangle form the flexible arms 50, 56, 57, and 58 with the portions of the sides between each of the coupling members and the adjacent corners of the square forming the flexible arm portions, such as 51 and 53, while the corner areas, where the sides of the rectangle intersect, form the planar intermediate portions, such as 55. To fold or bend the square band 70 of FIG. 4 so as to assume the convoluted shape illustrated in FIG. 2 a first pair of opposed sides are moved through complimentary arcs as indicated by arrows 71 and 72. This causes the band to assume the shape illustrated in FIG. 5. Then the other pair of opposed sides of the band 70 are moved through complimentary arcs as indicated by the arrows 73 and 74 in FIG. 5. This brings the band 70 into the configuration illustrated in FIG. 2. When the flexible coupling then is connected to input and output members respectively, it will retain the general configuration shown in FIG. 2.

The foregoing is a description of the preferred embodiments of the present invention. However variations may be made thereto without parting from the true spirit of the invention, as defined in the appended claims.

What is claimed is:

1. A flexible coupling for drivingly interconnecting a driving member and a driven member, comprising:
    a first coupling arrangement adapted for pivotal connection to one of the driving and driven members;
    a second coupling arrangement adapted for pivotal connection to the other of the driving and driven members; and
    a plurality of flexible arms drivingly interconnecting said first and second coupling arrangements;
    each of said arms including a first arm portion smoothly curved about a first axis; a second arm portion smoothly curved about a second axis perpendicular to said first axis; and a planar intermediate portion joining said first and second arm portions and disposed generally parallel to said first and second axes whereby said flexible coupling will transmit rotary motion between the driving member and the driven member in a substantially uniform manner even though the driving and driven members are out of alignment.

2. A flexible coupling as set forth in claim 1, wherein:
    each of said coupling arrangements comprises a pair of coupling members;
    each of said pair of coupling members is adapted for pivotal connection to one of the driven and driving members;
    each of said coupling members is connected to two of said flexible arms; and
    said flexible arms are constructed and arranged such that each coupling member is interconnected with both of said coupling members of the other of said coupling arrangements.

3. A flexible coupling as set forth in claim 2, wherein each of said coupling members is formed integrally with the two of said flexible arms to which it is interconnected.

4. A flexible coupling as set forth in claim 1 wherein each of said coupling arrangements comprises at least one coupling member operatively connected to corresponding ones of said flexible arms and adapted for pivotal connection to one of the driving and driven members.

5. A flexible coupling as set forth in claim 1 wherein each of said coupling arrangements comprises an elongated coupling member operatively connected to four of said arm portions and each of said coupling members defines a elongated bore therethrough for pivotal connection of said coupling member to one of the driving and driven members.

6. A flexible coupling as set forth in claim 2 or 5 formed as a unitary structure.

7. A flexible coupling for connecting a driving member to a driven member, comprising:
    a continuous band of flexible material having first and second opposed surfaces;
    a first pair of coupling members extending from said first band surface and adapted for pivotal connection to one of the driving and driven members; and
    a second pair of coupling members extending from said second band surface and adapted for pivotal connection to the other of the driving and driven members;
    said coupling members being alternately positioned around said band with substantially uniform spacing;
    the section of said band between successive coupling members forming an arm including a first arm portion smoothly curved about a first axis, a second arm portion smoothly curved about a second axis and a generally planar intermediate portion joining said first and second arm portions and disposed generally parallel to said first and second axes;
    whereby said flexible coupling will transmit rotary motion between the driving member and the driven member even though the driving and driven members are out of alignment.

8. A flexible coupling as set forth in claim 7 formed by molding said continuous band of flexible material in the shape of a rectangle with said first pair of coupling members extending from said first band surface, at the midpoints of respective ones of a one opposed pair of sides of said band and said second pair of coupling members extending from said second band surface at the midpoints of respective ones of the other opposed pair of sides of said band; moving one opposed pair of sides of said band through complimentary arcs to bring that pair of sides into juxtaposition and moving the other opposed pair of sides through complimentary arcs to bring that pair of sides into juxtaposition so that each portion of said band between a coupling member and a corner juncture of adjacent sides of said band forms a corresponding one of said smoothly curved arm portions and each corner juncture of adjacent sides of said band forms a corresponding one of said generally planar intermediate portions.

* * * * *